United States Patent
Hahn et al.

(10) Patent No.: US 7,088,448 B1
(45) Date of Patent: Aug. 8, 2006

(54) ELLIPSOMETER MEASUREMENT APPARATUS

(75) Inventors: Juergen Hahn, Dettingen (DE); Goetz Kuehnle, Hemmingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/485,325

(22) PCT Filed: Aug. 6, 1998

(86) PCT No.: PCT/DE98/02260

§ 371 (c)(1),
(2), (4) Date: May 22, 2000

(87) PCT Pub. No.: WO99/08068

PCT Pub. Date: Feb. 18, 1999

(30) Foreign Application Priority Data

Aug. 11, 1997 (DE) .................... 197 34 646

(51) Int. Cl.
*G01J 4/00* (2006.01)
(52) U.S. Cl. ..................................... 356/369
(58) Field of Classification Search ............... 356/369, 356/630, 364; 250/225
See application file for complete search history.

(56) References Cited

U.S. PATENT DOCUMENTS 3,985,447 A * 10/1976 Aspnes ..................... 356/369

(Continued)

FOREIGN PATENT DOCUMENTS

EP   0 397 388       11/1990
JP   05280937 A  * 10/1993

(Continued)

OTHER PUBLICATIONS

"Automated Multiple Angle of Incidence Ellipsometer System," Feb. 1, 1990, IBM Technical Disclosure Bulletin, vol. 32, Issue No. 9a, pp. 417-424.*

(Continued)

*Primary Examiner*—Gregory J. Toatley, Jr.
*Assistant Examiner*—Gordon J. Stock, Jr.
(74) *Attorney, Agent, or Firm*—Kenyon & Kenyon

(57) ABSTRACT

An ellipsometer measurement apparatus for determining the thickness of a film applied on a substrate, is described. The apparatus includes a light source emitting an incoming beam, a transmitting optical system conveying the polarized incoming beam to an incidence point on the substrate, and a receiving optical system that has an analyzer and conveys the reflected beam formed at the incidence point to a photodetector device, the polarization direction of the incoming beam and of the analyzer being modified in time relative to one another, and the intensity changes produced thereby being evaluated by way of an evaluation device in order to determine the film thickness. Easy handling and accurate measurement of the film thickness, even on difficult-to-access measured objects having differing curvatures, are achieved by the fact that an angle measurement device is provided with which the angle of the reflected beam relative to a tangential plane of the substrate at the incidence point can be sensed, and that the film thickness can be determined by way of the evaluation device as a function of the angle that is sensed.

6 Claims, 1 Drawing Sheet

U.S. PATENT DOCUMENTS

| | | |
|---|---|---|
| 4,647,207 A | 3/1987 | Bjork et al. |
| 4,872,758 A | 10/1989 | Miyazaki et al. |
| 4,957,368 A * | 9/1990 | Smith .......................... 356/369 |
| 4,999,014 A * | 3/1991 | Gold et al. .................. 356/632 |
| 5,333,052 A | 7/1994 | Finarov |
| 5,757,494 A | 5/1998 | Herzinger et al. |
| 5,764,365 A * | 6/1998 | Finarov ....................... 356/369 |
| 5,838,432 A * | 11/1998 | Tokuhashi et al. ..... 356/139.03 |

FOREIGN PATENT DOCUMENTS

| | | |
|---|---|---|
| WO | WO 96 29583 | 9/1996 |
| WO | WO 97 35177 | 9/1997 |

OTHER PUBLICATIONS

BoschTechnische Berichte, vol. 4 (1974), No. 7, pp. 315-320*.

* cited by examiner

ELLIPSOMETER MEASUREMENT APPARATUS

FIELD OF THE INVENTION

The present invention relates to an ellipsometer measurement apparatus for determining the thickness of a film applied on a substrate. The apparatus includes a light source emitting an incoming beam, a transmitting optical system conveying the polarized incoming beam to an incidence point on the substrate, and a receiving optical system that has an analyzer and conveys the reflected beam formed at the incidence point to a photodetector device. The polarization direction of the incoming beam and of the analyzer are modified in time relative to one another, and the intensity changes produced thereby is evaluated by way of an evaluation device in order to determine the film thickness.

BACKGROUND INFORMATION

An ellipsometer measurement apparatus described in Bosch Technische Berichte, Vol. 4 (1974), No. 7, pages 315–320. It is possible with a measurement apparatus of this kind, for example, to measure the thickness of protective films on aluminum-coated headlight reflectors in the form of a paraboloid mirror with a large aperture ratio; the film thicknesses are in the range from 10 to 50 nm, and a resolution on the order of a nanometer is achievable. For this purpose, a polarized incident beam is directed at a predefined angle of incidence onto a measurement point of the headlight reflector, and is reflected at an angle that is also predefined. The reflected beam is elliptically polarized, and for determination of the ellipticity is conveyed through a rotating analyzer onto a photodetector on which intensity fluctuations of the light signal that correspond to the ellipticity are sensed. The ellipticity and thus the change in intensity depend on the film thickness, so that the latter can be determined in a downstream evaluation device. The angle of the incident beam and reflected beam in terms of the tangential plane or the normal line at the measurement point is often difficult to establish, and accurate adjustment is almost impossible at difficult-to-access locations or with changing curvature profiles, as in the case of modern headlights.

SUMMARY

It is an object of the present invention to provide an ellipsometer measurement apparatus that, while easy to adjust and handle, supplies accurate measurement results even at difficult-to-access locations and with differing curvature profiles.

According to an example embodiment of the present invention, an angle measurement device is provided with which the angle of the reflected beam relative to a tangential plane of the substrate at the incidence point can be sensed, and the film thickness can be determined by way of the evaluation device as a function of the angle that is sensed. Because the angle of the reflected beam is sensed and is additionally evaluated in order to calculate the film thickness, the measurement apparatus can easily be placed on the film and the measurement can readily be performed. The resulting angle is substantially and accurately taken into account, and is incorporated into the calculation of the film thickness using conventional algorithms.

Measurement of the angle can also be accomplished in simple fashion by the fact that the angle measurement device has a photodetector unit that is position-sensitive in the X and/or Y direction, as well as an evaluation stage with which the angle of reflection can be calculated from the position data and from distance data. Experiments have shown that even a one-dimensional angle determination yields good measurement results for the film thickness.

The simple configuration is promoted by the fact that the intensity changes and the position of the reflected beam are sensed with the same photodetector of the photodetector device.

A further possibility for easy determination of the angle consists in the fact that the photodetector device has two position-sensitive photodetectors arranged at different distances from the incidence point in the beam path of the reflected beam, and that the angle is calculated on the basis of the differing positions of the reflected beam on the two photodetectors. Here again, one of the photodetectors can be utilized simultaneously to measure the intensity changes of the reflected beam.

When the angle is determined using two photodetectors, the configuration can be, for example, such that a beam splitter is arranged in the beam path of the reflected beam in front of the two photodetectors, and that each photodetector receives a partial beam of the reflected beam. Alternatively, the two photodetectors can also be arranged one behind another, a portion of the reflected beam passing through the front photodetector.

If only one photodetector is used, provision is advantageously made for a converging lens to be arranged in front of the photodetector device.

Simple handling is promoted by the fact that the transmitting optical system and the receiving optical system are integrated into a common carrier, and that the carrier has a three-point support for placement on the film. With this configuration, unequivocal placement on the film is also always guaranteed. The three-point support can comprise, for example, a ball support which on the one hand guarantees single-point support at the three support points and on the other hand prevents damage to the film.

In order to obtain reliable measurement results, it has proven advantageous to use a configuration in which the transmitting optical system has a polarizer and a $\lambda/4$ plate in the beam path of the incoming beam, and the polarizer or the analyzer is arranged in rotationally drivable fashion about an axis normal to its surface.

DETAILED DESCRIPTION

Figure 1:
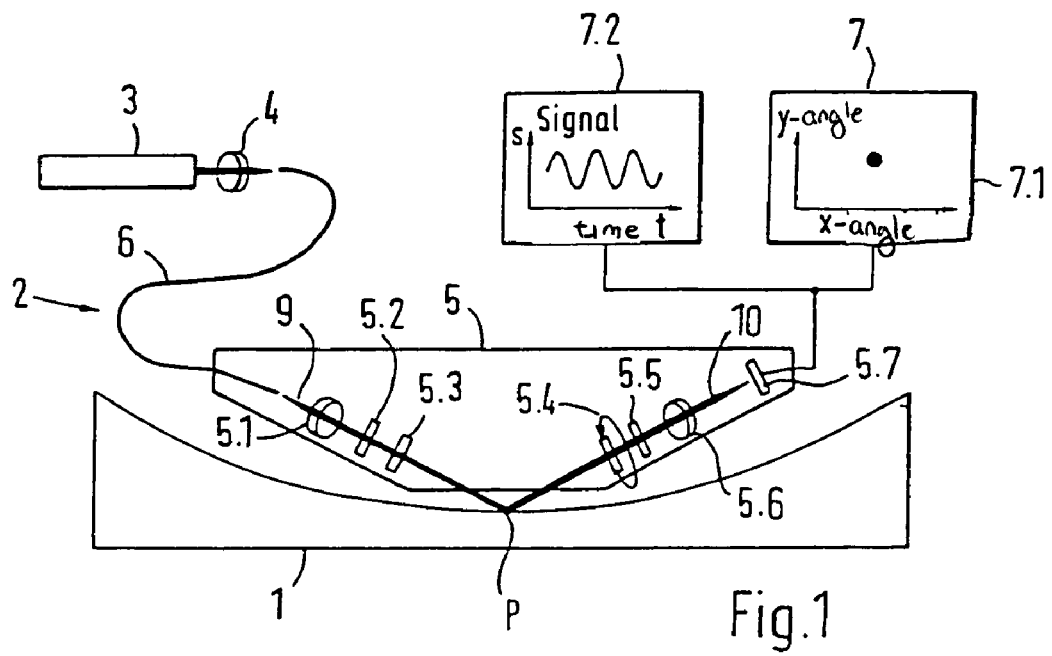
FIG. 1 shows a schematic description of an ellipsometer measurement apparatus in a partially sectioned side view.

FIG. 1 shows a measured object 1 made up of a substrate and a film, applied onto the concavely curved inner side thereof, whose thickness at a measurement point P is to be measured using a measurement arrangement 2.

Measurement arrangement 2 possesses a laser 3, a lens 4 in front of the latter, a light guide 6, a measurement probe 5, and an evaluation device 7. The light beam generated by laser 3 passes through front-mounted lens 4 and light guide 6, as incoming beam 9, into measurement probe 5, and is directed by the latter, through a transmitting optical system having a lens 5.1, a polarizer 5.2, and a λ/4 plate 5.3, onto the measurement point or incidence point P of measured object 1.

The beam reflected at incidence point P, in the form of reflected beam 10, passes, in a receiving optical system, through a rotationally driven analyzer 5.4, a filter 5.5, and a converging lens 5.6, and is focused by the latter onto a photodetector 5.7. Photodetector 5.7 belongs to a photodetector device that detects on the one hand intensity fluctuations of reflected beam 10, and on the other hand the incidence beam location on photodetector 5.7. Photodetector 5.7 can be, for example, a position-sensitive detector (PSD) or a CCD camera. A position measuring instrument 7.1 for an X and/or Y position is provided in evaluation device 7. The distance from the incidence point P is taken into account when the X and/or Y angle is calculated. Also provided is an intensity measuring instrument 7.2 that senses the intensity fluctuations of reflected beam 10 resulting from the rotation of analyzer 5.4 and serves to calculate the ellipticity.

From the ellipticity, and taking into account the reflection angle ascertained from the X and/or Y angle, the film thickness can be determined using conventional algorithms. In this context, empirical tabulated values that are stored in a memory can also be utilized, for example, to determine the film thickness.

Figure 2:
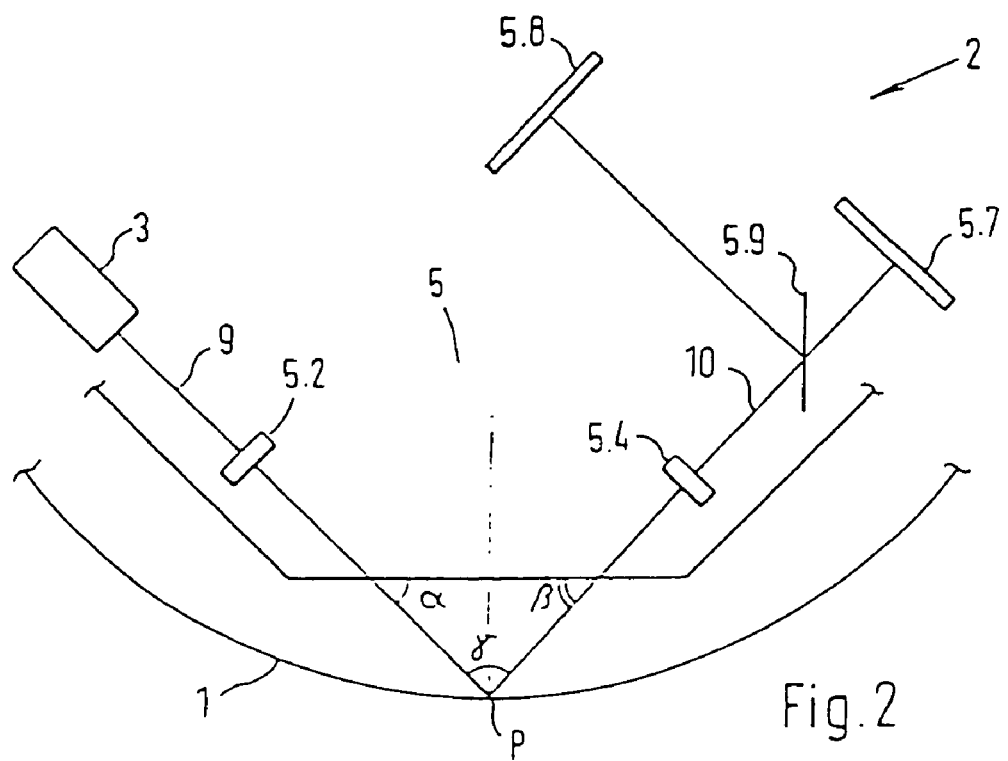
FIG. 2 shows a side view of a further ellipsometer measurement apparatus.

Whereas in the configuration according to FIG. 1 the same photodetector 5.7 is used to measure the intensity change and to calculate the angle, with the otherwise corresponding configuration according to FIG. 2, two photodetectors 5.7 and 5.8, at different distances from incidence point P, are provided for determination of the angle. Reflected beam 10 is split at a beam splitter 5.9 into two partial beams that pass along different path lengths before reaching the associated photodetectors 5.7 and 5.8. From the different X and/or Y positions on the two photodetectors 5.7 and 5.8, the X and Y angles (and from them the angle of reflection) can be ascertained as a function of the different path lengths. One of the two photodetectors 5.7 and 5.8 can simultaneously be utilized for the intensity measurement. FIG. 2 also shows the angle α of incident beam 9 with respect to a tangential plane at incidence point P, the angle β of reflected beam 10 also with respect to the tangential plane, and an angle γ between the incident beam and reflected beam.

Instead of analyzer 5.4 shown in FIG. 1 that is rotatable about a surface normal line, the analyzer can also be replaced by a stationary analyzer and instead a rotating polarizer 5.2 can be provided in the transmitting optical system. It has been found that the reliability of the measurement results can thereby be improved.

The transmitting optical system and receiving optical system are installed in a common carrier that is equipped with a three-point support, for example in the form of balls or spherical caps, thus attaining unequivocal placement of the measurement apparatus on measured object 1 even at difficult-to-access points and when different curvatures are present. The measurement apparatus, being a probe, is easy to handle, and is simple to adjust because the angle of the reflected beam is automatically sensed.

What is claimed is:

1. An ellipsometer measurement apparatus for determining a thickness of a film applied on a substrate, comprising:
    a light source emitting a beam;
    a transmitting optical system conveying the beam to an incidence point on the substrate, the substrate reflecting the beam from the incidence point;
    a photodetector device;
    a receiving optical system conveying the reflected beam to the photodetector device, the receiving optical system including an analyzer, a polarization direction of the beam and of the analyzer being modified in time relative to one another;
    an evaluation device evaluating intensity changes in the reflected beam and determining the film thickness as a function of the intensity changes; and
    an angle measurement device sensing an angle of the reflected beam relative to a tangential plane that does not intersect the substrate at the incidence point, the evaluation device determining the film thickness as a function of the sensed angle, wherein:
    the angle measurement device includes a photodetector unit that is position-sensitive in at least one of an X and Y direction, an angle of reflection being calculated from position data and distance data with an evaluation stage, and
    the intensity changes and the position data are sensed with a same photodetector.

2. The measurement apparatus according to claim 1, further comprising:
    a converging lens arranged in front of the photodetector device.

3. The measurement apparatus according to claim 1, wherein the transmitting optical system includes a polarizer and a λ/4 plate in a beam path of the beam, and wherein one of the polarizer and the analyzer is arranged in rotationally driven fashion about an axis normal to a surface of the one of the polarizer and the analyzer.

4. An ellipsometer measurement apparatus for determining a thickness of a film applied on a substrate, comprising:
    a light source emitting a beam;
    a transmitting optical system conveying the beam to an incidence point on the substrate, the substrate reflecting the beam from the incidence point;
    a photodetector device;
    a receiving optical system conveying the reflected beam to the photodetector device, the receiving optical system including an analyzer, a polarization direction of the beam and of the analyzer being modified in time relative to one another;
    an evaluation device evaluating intensity changes in the reflected beam and determining the film thickness as a function of the intensity changes; and
    an angle measurement device sensing an angle of the reflected beam relative to a tangential plane that does not intersect the substrate in an area of the incidence point, the evaluation device determining the film thickness as a function of the sensed angle,
    wherein the photodetector device includes two position-sensitive photodetectors arranged at different distances from the incidence point in a beam path of the reflected beam, the angle of reflecting being calculated based on differing positions of the reflected beam on the two position-sensitive photodetectors.

5. The measurement apparatus according to claim 4, further comprising:
    a beam splitter arranged in the beam path of the reflected beam in front of the two position-sensitive photodetectors, each of the two position-sensitive photodetectors receiving a partial beam of the reflected beam.

6. The measurement apparatus according to claim 4, wherein a first one of the two position-sensitive photodetectors is arranged behind a second one of the two position-sensitive photodetectors, at least a portion of the reflected beam passing through the second position-sensitive photodetectors to the first position-sensitive photodetector.

* * * * *